EDGAR J. SMITH
INVENTOR

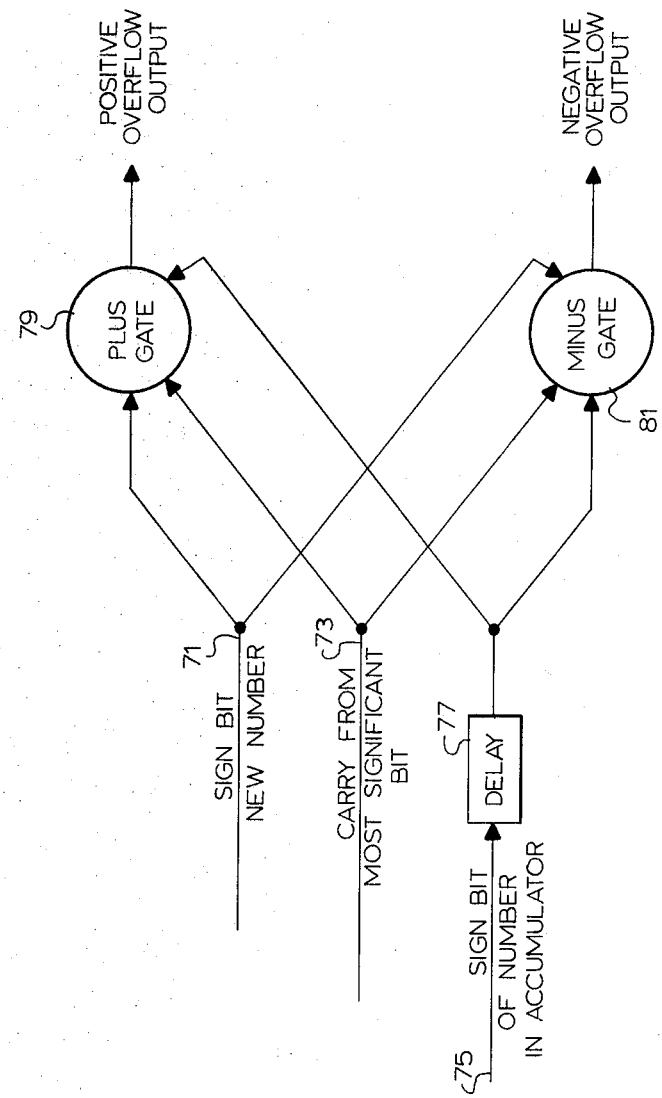

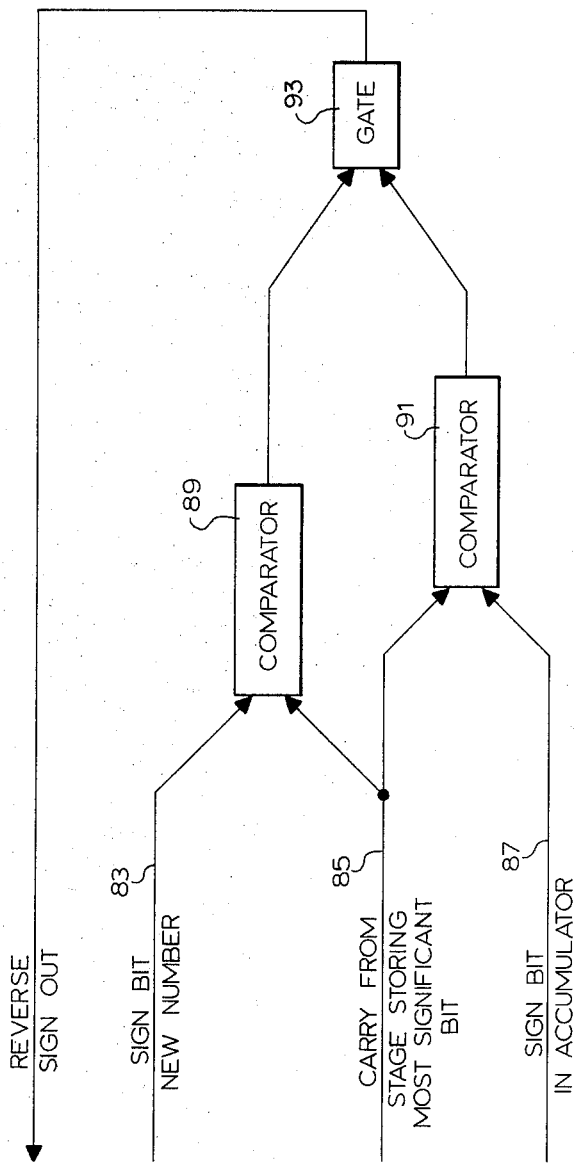

United States Patent Office 3,250,899
Patented May 10, 1966

3,250,899
DIGITAL NAVIGATION FOR COMPUTING
LATITUDE AND LONGITUDE
Edgar J. Smith, Verona, N.J., assignor to General Precision Inc., Little Falls, N.J., a corporation of Delaware
Filed Jan. 4, 1963, Ser. No. 249,441
9 Claims. (Cl. 235—152)

This invention relates to digital navigation systems and more particularly to a system which computes the latitude and longitude from velocity signals entirely by digital means.

Prior to the present invention computation of latitude and longitude was carried out by analog means. The accuracy of these systems is limited by the accuracy of the analog signals representing velocity in the systems, the accuracy of the analog components of the systems, and drift in the analog systems. By increasing the accuracy of the analog velocity signals and the analog components and by reducing the drift, the accuracy of the analog systems can be increased, but there is a limit as to how much the accuracy can be increased in this manner in a practicable analog navigation system. The present invention provides a digital navigation system, which is capable of providing latitude and longitude information with much greater accuracy than was feasible with the analog systems of the prior art. Because the navigation system of the present invention carries out the computations to provide the navigation information entirely by digital means, the accuracy of which it is capable is inherently much greater than the analog systems of the prior art because it is not subject to drift, component inaccuracy, or signal inaccuracy within the system. The only limitation on the accuracy of the system is the accuracy of the velocity signals fed to the navigation system.

Accordingly, an object of the present invention is to provide an improved navigation system.

Another object of the present invention is to provide a more accurate navigation system.

A further object of the present invention is to provide a digital navigation system for computing latitude and longitude from applied velocity signals.

A still further object of the present invention is to increase the accuracy of latitude and longitude information computed by a navigation system.

These objects are accomplished in the system of the present invention by digitally integrating the applied velocity signal making use of accumulators to perform the digital integration. The accumulator integration of the east-west velocity signal to provide the longitude information takes into account the longitude convergence by providing means to make the capacity of this accumulator variable in accordance with the cosine of the latitude. This is accomplished by adding to the longitude accumulator a binary signal having a magnitude proportional to one minus the cosine of the latitude each time the longitude accumulator overflows. The binary number having a magnitude equal to one minus the cosine of the latitude of course, varies with the latitude and in continuously determined by the system by digital integration.

Further objects and advantages of the present invention will become readily apparent as the following detailed description of the invention unfolds and when taken in conjunction with the drawings wherein:

FIG. 2 is a block diagram illustrating the logic circuitry for generating the desired overflow signals from the accumulators used by the system of the present invention; and FIG. 3 is a block diagram of the logic circuitry used to control the sign of the accumulator.

Figure 1:
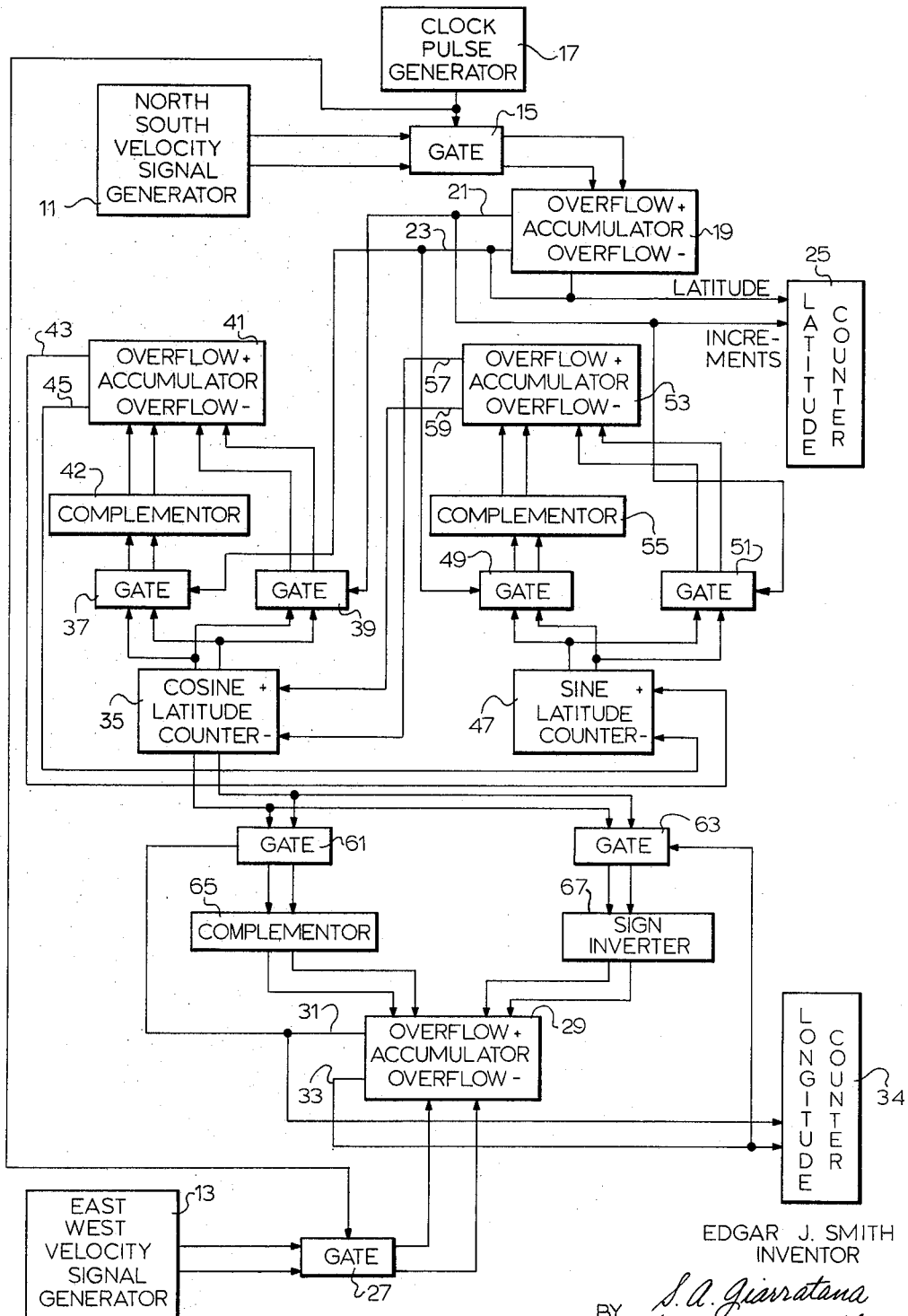
FIG. 1 is a block diagram of the system of the invention.

As shown in FIG. 1 the system of the present invention comprises a north-south velocity signal generator 11 and an east-west velocity signal generator 13. The north-south velocity signal generator 11 produces a thirteen bit binary output, which represents the velocity in the north-south direction and the east-west velocity signal generator 13 produces a thirteen bit binary output representing the velocity in the east-west direction. In the digital system of the present invention the sign of a given binary number is represented by one of the bits in the number, a 1 representing a positive number and a 0 representing a negative number. A positive binary output from the north-south velocity signal generator 11 indicates a velocity in the northerly direction and a negative binary output from this generator indicates a velocity in the southerly direction. A positive binary output from the east-west velocity signal generator 13 indicates a velocity in the westerly direction and a negative output from the east-west velocity signal generator 13 indicates a velocity in the easterly direction. The magnitude of negative numbers in the binary code used in the present invention is represented by the complement of the positive numbers of corresponding magnitude. This feature enables the system to use the same logic circuitry used for the addition of numbers of the same sign to algebraically add numbers of the opposite sign with the result of the addition being the difference between the negative and positive numbers. The binary output from the north-south velocity signal generator 11 is applied to a gate 15, which is periodically enabled by a clock pulse generator 17 at a constant repetitive rate. Thus the gate 15 sequentially samples the binary output of the north-south velocity signal generator 11. The sequential samples of velocity represented by the binary output of the gate 15 are successively fed to an accumulator 19, which adds each successive binary number applied thereto by the gate 15 to the total stored in the accumulator 19. Thus, if the total stored in the accumulator 19 is a positive number and the gate 15 applies a positive binary number to the accumulator 19, the total stored in the accumulator 19 will be increased by the amount of the positive number applied thereto by the gate 15 unless this total would be greater than the capacity of the accumulator 19. If the sum of the number stored in the accumulator 19 plus the number applied thereto by the gate 15 exceeds the capacity of the accumulator 19, the accumulator 19 will produce an output pulse from its positive overflow output 21 and will store a positive number equal to the sum of the number previously stored in the accumulator 19 plus the number applied thereto from the gate 15 minus the capacity of the accumulator 19. If the number stored by the accumulator 19 is positive and a negative binary number is applied to the accumulator 19 from the gate 15, the total stored in the accumulator 19 will be decreased by the amount of the negative number applied to the accumulator 19 by the gate 15. This will be true even if it makes the sign of the number stored in the accumulator 19 negative. If the number stored in the accumulator 19 is negative and a negative number is applied to the accumulator 19 by the gate 15, then the magnitude of the negative number stored in the accumulator 19 will be increased by the amount of the negative number applied thereto by the gate 15 unless the sum of the negative number stored in the accumulator 19 and the negative number applied to the accumulator 19 by the gate 15 is greater than the capacity of the accumulator 19. When the sum of a negative number stored in the accumulator 19 and a negative number applied to the accumulator 19 by the gate 15 exceeds the capacity of the accumulator 19, the accumulator 19 will produce a pulse from its negative overflow output 23 and will store a negative number equal to the sum of the negative number previously stored by the accumulator 19 and the negative number applied thereto by the gate 15 less the capacity of the accumulator 19. When the accumulator 19 produces an output pulse from its plus overflow output it indicates that the latitude has changed one increment in a northerly direction and when the accumulator 19 produces an output pulse from its minus overflow output 23, it indicates that the latitude has changed one increment in a southerly direction. Thus by counting the pulses produced at the outputs 21 and 23 the latitude can be continuously determined. Accordingly the output pulses produced at outputs 21 and 23 by the accumulator 19 are applied to a counter 25, which counts in a positive direction in response to pulses applied thereto from the output 21 and counts in a negative direction in response to pulses applied thereto from the output 23. The count registered by the counter 25 will continuously represent the latitude. The units of the latitude will be determined by the capacity of the accumulator 19, the frequency at which the clock pulse generator 17 enables the gate 15, and the scale of the binary output of the velocity signal generator 11. For example if velocity is represented by the binary output of the signal generator 11 in units such that one bit in the least significant order of the binary number represents one-half a knot and the clock pulse generator 17 enables the gate 15 at a rate of 5.68888 times per second, and the capacity of the accumulator 19 is 4,096 bits, then each output pulse of the accumulator 19 and each unit of the count registered by the counter 25 will represent one-tenth of an arc minute. The formula for determining the units of the count registered by the counter 25 or in other words the increment of latitude represented by each pulse produced at output 21 or 23, is as follows:

$$X = \frac{Kn-sA}{3600C}$$

in which X is the number of arc minutes represented by each output pulse of the accumulator 19, $Kn-s$ is the velocity in knots represented by one unit in the least significant order in the binary output of the generator 11, A is the capacity of the accumulator 19, and C is the number of times per second that the clock pulse generator 17 enables the gate 15. The 3600 is a factor to convert the velocity to nautical miles per second.

The count registered by the counter 25 represents the latitude because the adding of successive velocity samples is a close approximation of the integral of velocity and the integral of the velocity in the north-south direction will produce the latitude. The accumulator 19 in effect divides the integral of velocity by a factor A which is the capacity of the accumulator. The longitude cannot be determined as simply as the latitude because the longitude is produced by integrating the velocity in the east-west direction divided by the cosine of the latitude and since the latitude is not a constant but is continuously changing, a direct integration of velocity in the east-west direction, as is done with the velocity in the north-south direction to produce latitude, will not produce a number proportional to the longitude. The system of the present invention provides digital means to integrate the velocity in the east-west direction divided by the cosine of the latitude. To accomplish this integration, the binary output of the east-west velocity signal generator 13 is applied to a gate 27, which is periodically enabled by the clock pulse generator 17 at the same rate that it enables the gate 15. Thus the gate 27 sequentially samples the velocity represented by the binary output of the generator 13. The sequential samples obtained by the gate 27 are successively applied to an accumulator 29 and added to the contents thereof. The accumulator 29 operates in the same manner as the accumulator 19 and has the same capacity A as the accumulator 19. The positive overflow output of the accumulator 29 is designated by the reference number 31 and the negative overflow output is designated by the reference number 33. Means are provided to change the capacity of the accumulator 29 in accordance with the latitude. Instead of having a capacity of A, the accumulator 29 is made to have a capacity equal to A times the cosine of the latitude. This variable capacity is achieved by adding a binary number having a magnitude equal to A minus A times the cosine of the latitude to the contents of the accumulator each time the accumulator overflows. This reduces the remaining capacity of the accumulator 29 to A times the cosine of the latitude It is important in reducing the capacity of the accumulator 29 that the binary number added to the accumulator 29 to reduce its capacity does not enter into the integration process and cause false output pulses. Because the quantity having a magnitude equal to A minus A times the cosine of the latitude is added to the accumulator 29 only when it overflows, the addition of the quantity does not enter falsely into the integration process. The adding of the successive samples of east-west velocity to the accumulator 29 in effect is integrating the velocity in the east-west direction. Because the capacity of the accumulator is made to be equal to the value of A times the cosine of latitude, the accumulator in effect divides by the quantity A times the cosine of the latitude. Since the capacity of the accumulator varies in accordance with the cosine of latitude as the integration is being carried out, the division by the accumulator 29 is into the integrand or before the integration rather than into the integral or after the integration. Thus each output pulse of the accumulator 29 will represent an increment of the integral:

$$\int \frac{Ve-wdt}{A \cos \Lambda}$$

in which $Ve-w$ is the velocity in the east-west direction, A is the capacity of the accumulator 29, and $\Lambda$ is the latitude. The size of the increment of longitude that each output pulse of the accumulator 29 represents is determined by the formula $$Y = \frac{Ke-wA}{3600C}$$

in which Y is the number of arc minutes of longitude represented by each output pulse of the accumulator 29 and $Ke-w$ is the knots of velocity represented by one unit in the least significant order in the binary output of the east-west velocity signal generator 13. Thus if $Ke-w$ equals $Kn-s$, then each pulse produced by the accumulator 29 will represent an increment of longitude having a magnitude in arc minutes equal to the magnitude in arc minutes of the increment of latitude represented by each output pulse from the accumulator 19. The output pulses of the accumulator 29 are counted by a counter 34, which counts in a forward direction in response to each pulse produced at output 31 representing a positive increment of longitude and counts backwards in response to each pulse produced from output 33 representing a negative increment of longitude. Thus the count registered by the counter 34 will continuously represent longitude. When the accumulator overflows with positive numbers, a positive binary number equal to $A-A \cos \Lambda$ must be added to the accumulator 29 to reduce its capacity and when it overflows with negative numbers a negative binary number equal to $-(A-A \cos \Lambda)$ must be added to the accumulator 29 to reduce its capacity. To generate the negative and positive binary numbers having magnitudes equal to $A-A \cos \Lambda$ a cosine latitude counter 35 is made use of. This counter operates to continuously store a binary number equal to the cosine of the latitude in the following manner. Signals representing the binary number stored in the cosine latitude counter 35 are continuously applied to a gate 37 and to a gate 39. Whenever the accumulator 19 produces a pulse at its output 21 indicating that the accumulator 19 has a positive overflow, the gate 39 is enabled and the signals representing the number stored in the cosine latitude counter 35 pass through the gate 39 and the number is added to the contents of an accumulator 41, which is the same type of accumulator as the accumulators 19 and 29 and produces a pulse on its output 43 when it overflows with positive numbers and a pulse on its output 45 when it overflows with negative numbers. Each pulse that is produced at the output 23 of the accumulator 19 indicating that the accumulator 19 has overflowed with negative numbers enables the gate 37 and as a result the signals representing the binary number stored in the counter 35 will pass through the gate 37 to a complementor 42 where they are converted to represent a negative number of equal magnitude. This negative number is then added to the contents of the accumulator 41. Thus whenever there is a change in latitude by one increment in the positive direction, a positive number equal to $A \cos \Lambda$ is added to the contents of the accumulator 41 and whenever the latitude changes by one increment in the negative direction a negative number equal to $-A \cos \Lambda$ is added to the contents of the accumulator 41. Whenever the accumulator 41 overflows with positive numbers the resulting pulse produced on its output 43 is applied to a sine latitude counter 47 and increases the count stored in the sine latitude counter 47 by one and whenever the accumulator 41 overflows with negative numbers, the resulting pulse produced from its output 45 is applied to the sine latitude counter 47 and reduces the count registered by the sine latitude counter 47 by one. The number registered by the sine latitude counter 47 is equal to $A \sin \Lambda$ and this equality can be maintained by the output pulses produced at the output 43 of the accumulator 41 increasing the count registered by the counter 47 by one and the output pulses of the accumulator 41 produced at output 45 decreasing the count registered by the counter 47 by one.

This fact will become evident from the following differential equations.

First let $$y1 = A \sin \lambda$$

and $$y2 = A \cos \lambda$$

then $$dy1 = A \cos \lambda d\lambda = y2 d\lambda$$

and $$dy2 = -A \sin \lambda d\lambda = -y1 d\lambda$$

Therefore incremental changes in $y1$ and $y2$ can be approximated as follows:

$$\Delta y1 = y2 \Delta \lambda$$

and $$\Delta y2 = -y1 \Delta \lambda$$

The quantity for $y1$ after an incremental change in latitude can be expressed as follows:

$$y1(\lambda_{i+1}) = y1(\lambda_i) + \Delta y1$$

in which $y1(\lambda_i)$ is the value of $y1$ before the incremental change in latitude and $y1(\lambda_{i+1})$ is the value of $y1$ after the incremental change in latitude. But since $$\Delta y1 = y2 \Delta \lambda$$

then $$y1(\lambda_{i+1}) = y1(\lambda_i) + y2 \Delta \lambda$$

Thus the value of $A \sin \lambda$ after each incremental change in latitude can be determined by adding $A \cos \lambda$ times the incremental change in latitude $\Delta \lambda$ to the value of $A \sin \Lambda$ before the incremental change in latitude. Thus by adding $A \cos \Lambda$ to a total each time the latitude increases by one increment and subtracting $A \cos \Lambda$ from this total each time the latitude decreases one increment, the total may be maintained proportional to $A \sin \Lambda$. The accumulator 41 in effect produces this total divided by the capacity of the accumulator 41 in the same manner that the accumulator 19 divides the integral of velocity by A. As in the case of the accumulator 19, the quotient resulting from the division is represented by the number of pulses produced from the positive overflow output 43 minus the number of pulses produced from the negative overflow output 45. The capacity of the accumulator 41 is selected such that each output pulse from the accumulator 41 represents one unit of the quantity $A \sin \Lambda$. Thus the number stored in the counter 47 is maintained equal to $A \sin \Lambda$.

Another way of visualizing how the output pulses from the accumulator 41 represent units of $A \sin \Lambda$ is to consider that the value of $A \sin \Lambda$ can be expressed as follows:

$$A \sin \Lambda = \int \cos \Lambda d\Lambda$$

Since the value of $A \cos \Lambda$ is being sampled at increments of latitude, the accumulator 41 is integrating the integral $\cos \Lambda d\Lambda$.

The capacity of the accumulator 41 is determined by first considering that the expressions $$A \sin \Lambda = \int \cos \Lambda d\Lambda$$
$$dy1 = y2 d\Lambda$$

are only true if $\Lambda$ is in units of radians. Because of this fact the sum of the samples of $A \cos \Lambda$ applied to the accumulator 41 will equal $A \sin \Lambda$ multiplied by the number of samples of $A \cos \Lambda$ taken per radian. Thus the output pulses of the accumulator 41 will each represent one unit of $A \sin \Lambda$ if the capacity of the accumulator 41 is made to equal the number of increments of latitude represented by the output pulses of the accumulator 19 that there are in one radian. In the preferred embodiment of the invention with each increment of latitude representing 1/10 of an arc minute, the capacity of the accumulator 41 will be 10 (the number of latitude increments per arc minute) × 60 (the number of arc minutes in a degree) × 180/$\pi$ (the number of degrees in a radian) = 108,000/$\pi$.

Signals representing the binary number stored in the sine latitude counter 47 are continuously applied to a gate 49 and a gate 51. Whenever the accumulator 19 produces a pulse at its output 21 indicating that it has a positive overflow, it enables the gate 51 and the signals representing the number registered in the counter 47 pass through the gate 51 and the number is added to the contents of an accumulator 53. Whenever the accumulator 19 produces a pulse at its output 23, it enables the gate 49 which then passes the signals representing binary number in the counter 47 to a complementor 55, which converts the applied signals to represent a negative number of equal magnitude and adds the negative number to the contents of the accumulator 53. Thus whenever the accumulator 19 has a positive overflow $A \sin \Lambda$ is added to the contents of the accumulator 53 and whenever the accumulator 19 has a negative overflow $A \sin \Lambda$ is subtracted from the contents of the accumulator 53. The accumulator 53 is the same type of accumulator as the accumulators 19, 29 and 41 produces a pulse from its output 57 when it has a positive overflow and a pulse from its output 59 when it has a negative overflow. The capacity of the accumulator 53 is the same as the capacity of the accumulator 41. When the accumulator 53 produces a pulse from its output 57 indicating that it has a positive overflow, this pulse reduces the count of the cosine latitude counter 35 by one and when the accumulator 53 produces a pulse at its output 59 indicating a negative overflow, it increases the count of the cosine latitude counter 35 by one. In this manner the binary number registered by the cosine latitude counter 35 can be maintained equal to the quantity A times the cosine of the latitude. This fact will become evident when it is considered that the value of $y2 = A \cos \lambda$ immediately after an incremental change in latitude can be approximated as follows:

$$y2(\lambda_{i+1}) = y2(\lambda_i) + \Delta y2$$

in which $y2(\lambda_{i+1})$ is the value of $y2$ after an incremental change in lattitude and $y2(\lambda_i)$ is the value of $y2$ before an incremental change in latitude. But since $$\Delta y2 = -y1\Delta\lambda$$

then $$y2(\lambda_{i+1}) = y2(\lambda_i) - y1\Delta\lambda$$

Therefore the capacity of the accumulator 53 can be selected to overflow each time the binary number representing $A$ cosine $\Lambda$ decreases one unit and to have a negatige overflow each time the binary number representing $A$ cosine $\Lambda$ increases one unit Thus with the capacity of the accumulator 53 properly selected and the pulses produced at the output 57 indicating a positive overflow decreasing the number registered by the counter 35 by one and the pulses produced at the output 59 indicating a negative overflow increasing the count registered by the counter 35 by one, the number registered by the counter 35 can be maintained at the value $A$ cosine $\Lambda$.

The production by the accumulator 53 of pulses each equal to one unit of the quantity $A$ cose $\Lambda$ can also be visualized when it is considered that the accumulator 53 is performing the following integration.

$$A\cos\Lambda = \int A\sin\Lambda d\Lambda$$

Since the above expression and the expression $$y2(\lambda_{i+1}) = y2(\lambda_i) - y1\Delta\lambda$$

are true for the latitude $\Lambda$ in units of radians, the capacity of the accumulator 53 like that of the accumulator 41 is selected to be the number of increments of latitude represented by the output pulses of the accumulator 19 in one radian.

The binary code for the quantity $A-A\cos\Lambda$ is identical to the code for the number $-A\cos\Lambda$ except that the bit in the code representing the sign of the code is reversed. Thus, if the number $A\cos\Lambda$ is complemented by reversing each of the bits in the code except the bit representing the sign of the number, a number will be produced equal to $A-A\cos\Lambda$. Similarly the code for the number equal to $-(A-A\cos\Lambda)$ is the same as the code for the number $A\cos\Lambda$ except that the sign bit is reversed. Thus the binary number $-(A-A\cos\Lambda)$ can be produced simply by reversing the sign bit of the number representing $A\cos\Lambda$. As pointed out above the number representing $A\cos\Lambda$ is stored in the counter 35. Signals representing this number are applied to a gate 61 and to a gate 63. Whenever the accumulator 29 has a positive overflow producing a pulse from its output 31, it enables the gate 61 and the signals representing the binary number $A\cos\Lambda$ pass through the gate 61 to a complementor 65. The complementor 65 reverses all bits of the applied binary number except the sign bit so that the output signals from the complementor 65 represent the positive binary number $A-A\cos\Lambda$. This number is added to the contents of the accumulator 29. Thus every time the accumulator 29 has a positive overflow, a number equal to $A-A\cos\Lambda$ is added to the contents of the accumulator 29 and its capacity is accordingly effectively reduced to $A\cos\Lambda$. Whenever the accumulator 29 has a negative overflow producing a pulse on its output 33, it enables the gate 63 which passes the signals representing the binary number $A\cos\Lambda$ to a sign inverter 67. The sign inverter 67 reverses the sign of the binary number while maintaining the remaining code of the binary number the same so that the output signals from the sign inverter represent a binary number equal to $$-(A-A\cos\Lambda)$$

The binary number represented by the output of the sign inverter 67 is added to the contents of the accumulator 29. Thus ever time the accumulator 29 has a negative overflow, a binary number equal to $-(A-A\cos\Lambda)$ is added to the contents of the accumulator 29 and the capacity of the accumulator 29 is accordingly effectively reduced to $A\cos\Lambda$. With the capacity of the accumulator 29 controlled in this manner, a pulse produced by the accumulator 29 on its output 31 will indicate an increase in the longitude by one increment and a pulse produced on the output 33 of the accumulator 29 will indicate a decrease in longitude by one increment. Thus the count registered by the counter 34 will continuously represent the longitude.

The sign of the accumulator and the pulses produced at the overflow output of the accumulator must be produced in accordance with the following table:

| Sign in Accumulator Prior to Addition | Sign of New Number | Carry From Most Significant Bit | Sign in Accumulator After Addition | Positive Overflow | Negative Overflow |
|---|---|---|---|---|---|
| 1 | 1 | 1 | 1 | 1 | 0 |
| 1 | 1 | 0 | 1 | 0 | 0 |
| 1 | 0 | 1 | 1 | 0 | 0 |
| 1 | 0 | 0 | 0 | 0 | 0 |
| 0 | 0 | 0 | 0 | 0 | 1 |
| 0 | 0 | 1 | 0 | 0 | 0 |
| 0 | 1 | 0 | 0 | 0 | 0 |
| 0 | 1 | 1 | 1 | 0 | 0 |

As can be seen from this table there is a positive overflow only when the sign of the number stored in the accumulator prior to the addition of a new number is positive, the new number added to the accumulator is positive, and there is a 1 carried from the stage in the accumulator storing the most significant bit when the number is added. Similarly there is a negative overflow only when the sign of the number stored in the accumulator prior to the addition of the new number is negative, the sign of the new number is negative, and there is a 0 carried from the stage of the accumulator storing the most significant bit when the new number is added to the accumulator. FIGURE 2 illustrates the logic circuitry for applying the pulses to the positive and negative overflow outputs of the accumulators.

As showing in FIG. 2, the signal representing the sign bit of the new number is applied to the logic circuitry at an input 71, the signal representing the carry from the most significant stage of the accumulator storing the most significant bit is applied to an input 73 and the signal representing the sign bit of the number in the accumulator is applied to an input 75. As pointed out above, in a positive number the sign bit is a 1, and in a negative number is a 0. 1's are conveniently represented by positive signal voltages and 0's are conveniently represented by negative signal voltages. The signal voltage representing the sign bit of the number stored in the accumulator applied at input 75 is applied through a delay line 77 to a plus gate 79 and a minus gate 81. The signal voltages applied at inputs 71 and 73 are applied directly to the plus gate 79 and the minus gate 81. The plus gate 79 is designed to produce an output pulse whenever it receives plus signal voltages applied to all three inputs. The minus gate 81 is designed to produce an output pulse whenever it receives minus signal voltages applied at all three inputs. Because of the delay provided by the delay line 77, the signal voltage applied to the gates 79 and 81 by the delay line 77 will represent the sign of the number stored in the accumulator prior to the addition each time a new number is added to the contents of the accumulator. Thus the gate 79 will produce an output pulse only when a positive new number is added to the accumulator, a one is carried from the stage of the accumulator storing the most significant bit of the accumulator, and the sign of the number stored in the accumulator prior to the addition of the new number is positive. The output of the plus gate 79 is used as the positive overflow output of the accumulator. The minus gate 81 will produce an output pulse only when a negative number is added to the contents of the accumulator, the carry from the stage of the accumulator storing the most significant bit is zero, and the sign of the number stored in the accumulator prior to the addition of the new number is negative. The output of the minus gate 81 is used as the negative overflow output.

It will be noted from the table above that the sign of the number in the accumulator is reversed only when the sign of the new number is opposite that of the number in the accumulator prior to the addition of the new number and the sign bit of the new number is the same as the carry from the stage of the accumulator storing the most significant bit. FIG. 3 illustrates logic circuitry which will reverse the sign bit in the accumulator only under these conditions. The signal representing the sign bit of the new number is applied to the logic circuitry shown in FIG. 3 over an input 83. The signal representing the carry from the stage of the accumulator storing the most significant bit is applied at an input 85 and the signal representing the sign bit of the number in the accumulator is applied at an input 87. The signals applied at inputs 83 and 85 are applied to a comparator 89 which produces an output pulse only if these signals are the same. Thus the comparator 89 will produce an output pulse only if the sign of the new number is positive and the carry from the stage of the accumulator storing the most significant bit is a 1, or the sign of the new number is negative and the carry from the stage of the accumulator storing the most significant bit is a 0. The signal applied at input 85 is also applied to a comparator 91 and the signal applied at input 87 representing the sign bit of the number in the accumulator is applied to the comparator 91. The comparator 91 will produce an output pulse only if it receives opposite signals from the input 87 and from the input 85. Thus the comparator 91 will produce an output pulse if the carry from the stage of the accumulator storing the most significant bit is a 1 and the sign of the number stored in the accumulator prior to the addition of the new number is negative, or if the carry from the stage of the accumulator storing the most significant bit is 0 and the sign of the number stored in the accumulator prior to the addition of the new number is positive. The output pulses of the comparators 89 and 91 are applied to a gate 93 which produces an output pulse only if it receives pulses from both the comparator 89 and the comparator 91. Whenever the gate produces an output pulse it reverses the sign bit of the accumulator. Thus the sign bit of the accumulator will be reversed when the sign bit of the new number is the same as the carry from the stage of the accumulator storing the most significant bit and the carry is opposite to the sign bit of the number stored in the accumulator prior to the addition of the new number.

The above description is of a preferred embodiment of the invention, and many modifications may be made thereto without departing from the spirit and scope of the invention, which is defined in the appended claims.

What is claimed is:

1. A system for digitally computing longitude comprising an accumulator operable (1) to algebraically add each applied number to the contents thereof, (2) to generate an output signal of a first characteristic each time said accumulator overflows with positive numbers, and (3) to generate an output signal of a second characteristic each time said accumulator overflows with negative numbers, means to apply to said accumulator numbers proportional to sequential samples of velocity in the east-west direction, and means responsive to each output signal of said accumulator of said first characteristic to apply to said accumulator a number equal to the capacity of said accumulator times the quantity, one minus the cosine of the latitude, and responsive to each output signal of said accumulator of said second characteristic to apply to said accumulator a number equal to the capacity of said accumulator times the quantity, the cosine of the latitude minus one.

2. A digital integrator comprising an accumulator operable (1) to algebraically add each applied number to the contents thereof, (2) to generate an output signal of a first characteristic each time the capacity of said accumulator overflows with positive numbers, and (3) to generate an output signal of a second characteristic each time said accumulator overflows with negative numbers, means to apply to said accumulator numbers proportional to sequential samples of the integrand, and a counter operable to count in one direction in response to each output signal of a first characteristic produced by said accumulator and operable to count in the opposite direction in response to each output signal of said second characteristic produced by said accumulator.

3. A system for digitally computing longitude comprising an accumulator operable (1) to algebraically add each applied number to the contents thereof, (2) to generate an output signal of a first characteristic each time said accumulator overflows with positive numbers, and (3) to generate an output signal of a second characteristic each time said accumulator overflows with negative numbers, means to apply to said accumulator numbers proportional to sequential samples of velocity in the east-west direction, and means responsive to an output signal from said accumulator of said first characteristic to apply to said accumulator a number equal to the capacity of said accumulator times the quantity, one minus the cosine of the latitude, and responsive to an output signal to said accumulator of said second characteristic to apply to said accumulator a number equal to the capacity of said accumulator times the quantity, the cosine of the latitude minus 1, and a counter operable in response to each output signal of said first characteristic of said accumulator to count in one direction and operable in response to each output signal of said second characteristic of said accumulator to count in the opposite direction.

4. A system for digitally computing latitude comprising an accumulator operable (1) to algebraically add each applied number to the contents thereof, (2) to generate an output signal of a second characteristic each time said accumulator overflows with positive numbers, and (3) to generate an output signal of a second characteristic each time said accumulator overflows with negative numbers, and a counter operable in response to an output signal of said first characteristic of said accumulator to count in one direction and operable in response to an output signal of said accumulator of said second characteristic to count in the opposite direction.

5. A system for digitally computing trigonometric functions of an angle comprising a first accumulator operable to add to its contents each applied number and to generate an output signal each time it overflows, a second accumulator operable to add to its contents each applied number and to generate an output signal each time it overflows, a first counter operable to count the output signals of said second accumulator, a second counter operable to count the output signals of said first accumulator, means to apply to said first accumulator a number proportional to the number registered by said first counter each time said angle changes by one increment, and means to apply to said second accumulator a number proportional to the number stored by said second counter each time said angle changes by one increment.

6. A system for digitally computing trigonometric functions of an angle comprising a first accumulator operable to add to its contents each applied number and to generate an output signal each time it overflows, a second accumulator operable to add to its contents each applied number and to generate an output signal each time it overflows, a first counter operable to count the output signals of said second accumulator, a second counter operable to count the output signals of said first accumulator, means to apply to said first accumulator a number equal to the number registered by said first counter each time said angle changes by one increment, means to apply to said second accumulator a number equal to the number registered by said second counter each time said angle changes by one increment, said first and second accumulators having capacities equal to the number of increments of said angle in one radian.

7. A system for digitally computing trigonometric functions of an angle comprising first and second accumulators each operable (1) to add each applied number to the contents thereof, (2) to generate an output signal of a first characteristic each time it overflows with positive numbers, and (3) to generate an output signal of a second characteristic each time it overflows with negative numbers, a first counter operable to count in a positive direction in response to each output signal of said second characteristic of said second accumulator and to count in a negative direction in response to each output signal of said first characteristic of said second accumulator, a second counter operable to count in a positive direction in response to each output signal of a first characteristic of said first accumulator and operable to count in a negative direction in response to each output signal of said second characteristic of said first accumulator, means to apply to said first accumulator a number proportional to the number registered by said first counter each time said angle changes by one increment, means to apply to said second accumulator a number proportional to the number registered by said second counter each time said angle changes by one increment.

8. A system for digitally computing trigonometric functions of an angle comprising a first accumulator operable to add to its contents each applied number and to generate an output signal each time it overflows, a second accumulator operable to add to its content each applied number and to generate an output signal each time it overflows, a first counter operable to count the output signals of said second accumulator, a second counter operable to count the output signals of said first accumulator, means to apply to said first accumulator a number proportional to the number registered by said first counter whenever said angle changes by one increment, the number applied to said first accumulator having one sign when said angle increases by one increment and having the opposite sign when said angle decreases by one increment, and means to apply to said second accumulator a number proportional to the number registered by said second counter whenever said angle changes by one increment, the number applied to said second accumulator having one sign when said angle increases by one increment and having the opposite sign when said angle decreases by one increment.

9. A navigation system comprising a first accumulator operable to add each applied number to the contents thereof and generate an output signal each time said accumulator overflows, means to apply numbers to said accumulator proportional to successive samples of velocity in the north-south direction, a second accumulator operable to add each applied number to the contents thereof and generate an output signal each time said second accumulator overflows, means to apply numbers to said second accumulator representing successive samples of velocity in an east-west direction, a third accumulator operable to add each applied number to its contents and to generate an output signal each time it overflows, a fourth accumulator operable to add each applied number to its contents and to generate an output signal each time it overflows, a first counter operable to count the output signals of said fourth accumulator, a second counter operable to count the output signals of said third accumulator, means to apply to said third accumulator a number proportional to the number registered by said first counter each time said first accumulator produces an output signal, means to apply a number proportional to the number registered by said second counter to said fourth accumulator each time said first accumulator produces an output signal, and means to produce from the number stored in said first counter a number having a magnitude equal to the capacity of said second accumulator times the quantity, one minus the cosine of latitude, and apply such number to said second accumulator each time said second accumulator overflows.

References Cited by the Examiner
UNITED STATES PATENTS

| | | | |
|---|---|---|---|
| 2,924,385 | 2/1960 | Burkhart | 235—188 |
| 3,021,068 | 2/1962 | Ostroff | 235—164 |
| 3,145,292 | 8/1964 | Schwaninger | 235—92 |

MALCOLM A. MORRISON, *Primary Examiner.*

ROBERT C. BAILEY, *Examiner.*

M. J. SPIVAK, *Assistant Examiner.*